(12) United States Patent
Turner et al.

(10) Patent No.: US 7,236,426 B2
(45) Date of Patent: Jun. 26, 2007

(54) INTEGRATED MAPPING AND AUDIO SYSTEMS

(75) Inventors: Rex Turner, Tulsa, OK (US); Ronald G. Weber, Owasso, OK (US)

(73) Assignee: Lowrance Electronics, Inc., Tulsa, OK (US)

( * ) Notice: Subject to any disclaimer, the term of this patent is extended or adjusted under 35 U.S.C. 154(b) by 345 days.

(21) Appl. No.: 10/937,011

(22) Filed: Sep. 8, 2004

(65) Prior Publication Data

US 2006/0050613 A1  Mar. 9, 2006

(51) Int. Cl.
*G01S 15/89* (2006.01)
(52) U.S. Cl. ......................................... 367/88; 367/116
(58) Field of Classification Search .................. 367/88, 367/116, 128; 701/211; 342/357.13
See application file for complete search history.

(56) References Cited

U.S. PATENT DOCUMENTS

| | | | |
|---|---|---|---|
| 4,879,697 | A | 11/1989 | Lowrance et al. |
| 5,537,380 | A | 7/1996 | Sprankle, Jr. et al. |
| 5,838,277 | A * | 11/1998 | Loomis et al. ......... 342/357.13 |
| 6,425,018 | B1 | 7/2002 | Kaganas et al. |
| 6,427,115 | B1 | 7/2002 | Sekiyama |
| 2001/0053970 | A1 | 12/2001 | Ford et al. |
| 2002/0011951 | A1 | 1/2002 | Pepin et al. |
| 2002/0076217 | A1 | 6/2002 | Rodriguez et al. |
| 2002/0116575 | A1 | 8/2002 | Toyomura et al. |
| 2002/0142759 | A1 | 10/2002 | Newell et al. |
| 2002/0151998 | A1 | 10/2002 | Kemppi et al. |
| 2004/0075679 | A1 * | 4/2004 | Carter et al. ................ 345/733 |
| 2004/0133347 | A1 * | 7/2004 | Britt .............................. 702/1 |
| 2006/0050613 | A1 * | 3/2006 | Turner .......................... 367/88 |

FOREIGN PATENT DOCUMENTS

WO    WO 97/04334 A    2/1997

OTHER PUBLICATIONS

Garmin, iQue 3600, Que Applications Guide; integrated handheld Que applications guide, Feb. 2004, pp. 1-62.
Garmin, GPSMAP 76S chartplotting receiver; Owner's manual and reference guide, Apr. 2003, pp. 1-71.

* cited by examiner

*Primary Examiner*—Dan Pihulic
(74) *Attorney, Agent, or Firm*—Alston & Bird LLP (57) ABSTRACT

An integrated position mapping system and an integrated sonar mapping system both permit recording, storage and playback of audio data. Audio data is provided to the integrated sonar mapping system or the integrated position mapping system so that it may be correlated to position data or echo data. The integrated sonar mapping system includes a sonar transducer for emitting and receiving sonar signals that may be subsequently be processed to provide echo data from objects in the water which reflect sonar signals. The integrated position mapping system includes a position receiver for providing position data. A controller not only processes the data for storage, but also correlates the audio data to echo data or position data. The correlated data may therefore be retrieved for playback of the audio data and display of the position data or echo data.

27 Claims, 5 Drawing Sheets

INTEGRATED MAPPING AND AUDIO SYSTEMS

FIELD OF THE INVENTION

The present invention relates to mapping systems, such as position mapping and sonar mapping; and, more particularly, the invention relates to audio systems in sonar and position mapping systems that play audio data and record and store audio data.

BACKGROUND OF THE INVENTION

Mapping and navigation systems typically determine the relative position of a user based upon positioning signals received from one or more land-based beacons, one or more orbiting satellites comprising the Global Positioning System ("GPS"), or other sources. Based upon these positioning signals, the mapping and navigation system can determine other navigational data, such as the present latitude and longitude position and the present compass heading, course over ground, bearing and speed over ground. In addition, mapping and navigation systems allow the operator to enter several event markers to identify specific positions and several waypoints to mark a course which the operator desires to follow. Accordingly, the mapping and navigation system can also determine the distance and bearing to the nearest event marker or to the nearest waypoint based upon the positioning signals.

In order to record historical positioning data, many GPS systems have recording and storage elements to allow waypoints and event markers to be stored for later use. For example, it is often desirable to mark a location with otherwise undefined map features for later return. Maps often include only the most relevant highways markers, elevation contours, and notable landmarks. When none of these distinguishing features are present, then marking a position may be helpful for future purposes, such as return or event marking. In navigation systems that do include event and waypoint markers, the event markers are limited to position and perhaps a brief identifier. If additional data is necessary, it might be manually written in an accompanying log or the like. Accompanying logs, however, require carrying additional materials, which may not always be desirable when using these systems.

In addition to referring to maps, such as paper maps or graphically displayed maps, in order to determine navigational information, boaters and sport fishermen commonly employ sonar systems, such as sonar depth finders and sonar fish finders, to provide detailed information regarding the contour of bottom surface of the body of water and objects submerged therein. A number of sonar systems have been developed which display the reflected sonar signals in a variety of manners. For example, some sonar systems include rotating disk lamps or "flashers" which produce a pulse of light upon the reception of a reflected sonar signal.

Other sonar systems were developed that included a chart recorder in order to provide historical mapping data indicative of the contour of the bottom surface of the body of water as well as the relative location of submerged objects, such as fish. These sonar mapping systems generate a strip chart on which markings indicate the contour of the bottom surface of the body of water as determined from the reflected sonar signals. Still, other sonar mapping systems having display devices have been developed to provide a historical graphical display of the bottom surface of the body of water over which the boat is passing as well as to identify submerged objects from which the sonar signals reflect. The associated display devices typically include cathode ray tubes, electroluminescent panels, liquid crystal displays and LED displays. These sonar systems also generally include advanced electrical circuitry, including one or more microprocessors or microcontrollers.

Microprocessors and microcontrollers not only provide a number of features that allow the operator to customize the resulting display, but are also easily adapted to permitting historical mapping of sonar data to be stored in memory. In particular, external memory systems allow storage and subsequent transfer to other compatible systems. One example of external storage in use today includes MMC cards, which is a flash memory storage and typically compatible numerous electronic systems including most home computers. External storage, therefore, permits a user to maintain historical data in other areas besides the sonar and navigation mapping systems themselves.

The above described sonar mapping systems and position mapping systems have, on occasion, been integrated into single systems relevant for marine fishing and navigation purposes. The features described above, when integrated into a single system, permit historical sonar and position data to be stored for future reference. As described above, however, these systems are limited in the amount of data that can be provided. In particular, subjective data regarding a location or sonar conditions at a location are not recorded by these systems. For example, it may be advantageous to identify a location by the events that happen, like the observation of fish concentration, or the objects that you see, such as the hull of a shipwreck sticking out of the water. While event logs may permit maintaining such data, they still require additional supplies, and it is often cumbersome or inconvenient to take the time to prepare journal entries to maintain such data. Therefore, it would be advantageous to provide an alternative method or apparatus to record such data.

BRIEF SUMMARY OF THE INVENTION

The present invention addresses the above by providing integrated sonar mapping systems, position mapping systems, and methods to record audio data, mapping data, and other data. As used herein a mapping system is a system that maps environmental data, such as echo data, position data, cartographic data, temperature data, compass data, and/or altimeter data. Accordingly, the embodiments of the invention include mapping such data individually or in any combination of such data. Also as used herein, an integrated system refers to the combination of an audio system and any of these mapping systems in a unitary device. As such, the audio system and mapping system advantageously permits audio and mapping data to be correlated.

According one embodiment of the invention an integrated sonar mapping system includes a sonar transducer for emitting a sonar signal through a body of water. The sonar transducer also receives return sonar signals reflected by objects in the body of water for processing by a controller. From the sonar transducer, the controller generates echo data representative of the returning sonar signals that have reflected upon an object in the water. The integrated sonar system also includes a audio system to record and audibly reproduce audio data. As used herein, audio data refers to sounds produced and recorded for the purpose of audibly listening to a reproduction of that sound. This is in contrast to echo data derived from the sonar signals emitted and received by the sonar transducer. The echo data is not normally audibly reproduced, but visually represented by a display. The audio portion, therefore, includes both a microphone and an audio speaker in communication with a controller such that audio data may be both recorded and played backed through the speaker. The echo data may be correlated to audio data by the controller and stored in a storage medium accessible for subsequent audio playback of the audio data and display of the echo data.

Various other aspects may also be included in an integrated sonar mapping system and include a keypad with operational keys to effect recording and playback. Also, a display may be used for permitting visual display of echo data. Other advantageous aspects of the invention may include providing a removable storage medium for playback on other compatible electronic devices and audio systems. For example, the removable storage device might comprise an MMC card, such as might be used with and compatible to a personal computing system. Therefore, the data stored on the removable storage medium may advantageously be transferred to and played back on other common consumer devices.

The audio portion may include audio processing elements that are not located on the controller, such as an audio coder-decoder (codec). An audio codec converts audio data from the microphone to a digital format thus permitting digital storage of the audio data by the controller in the storage medium. Similarly, the audio codec converts the digital data to an analog audio reproduced by the speaker. If it is desired to transfer the audio data to alternate compatible devices, as described above, a number of digital audio formats may be used including but not limited to MP3, WAV and Ogg format.

Accordingly, a method of storing echo data and audio data is also provided and may be performed by a system as described above or other systems. The method includes emitting a sonar signal through water, such as by way of a sonar transducer and receiving a return sonar signal reflected by objects in the body of the water. The return sonar signal is processed to form echo data representative of the return sonar signal. Also, the method includes receiving audio data from a microphone that corresponds to the echo data so that the echo data and the audio data may be correlated and stored for later playback and display.

According to another embodiment of the present invention, an integrated position data mapping system is provided. An integrated position mapping system includes a position receiver, which receives communication from at least one base station positioning system. A base station may include either or both satellite positioning systems, such as GPS, or radio beacon positing systems, such as Loran. As used herein, position data therefore corresponds to the data received relating to the position of the position receiver relative to the base station positioning. That is to say that position data may be a latitude and longitude, Universal Transverse Mercator coordinates, a line of position, or a cartographic representation of position. A controller is in communication with the position transceiver so that the position data may be processed, such as by being stored or transformed into other types of position data. An audio portion of the integrated position mapping system includes a microphone in communication with the controller so that audio data may also be recorded corresponding to the position data. The audio portion also includes an audio speaker responsive to the controller for audibly reproducing the audio data. As such, the controller can correlate the audio data to the position data. In order to playback the audio data at a later time, a storage medium, accessible by the controller, permits storing and retrieving the position data and the audio data provided by the microphone.

Other aspects of the integrated position mapping system also include a keypad and a screen display. Both the keypad and the screen display may be in communication with the controller in order to provide visual display of position data, and recording and playback of audio data. Other aspects of the integrated position mapping system may include a cartographic data storage that can be selected by the controller to display a portion of the cartographic data on the display. As such, the position data may be a map position visually reproduced on the display form the cartographic data.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
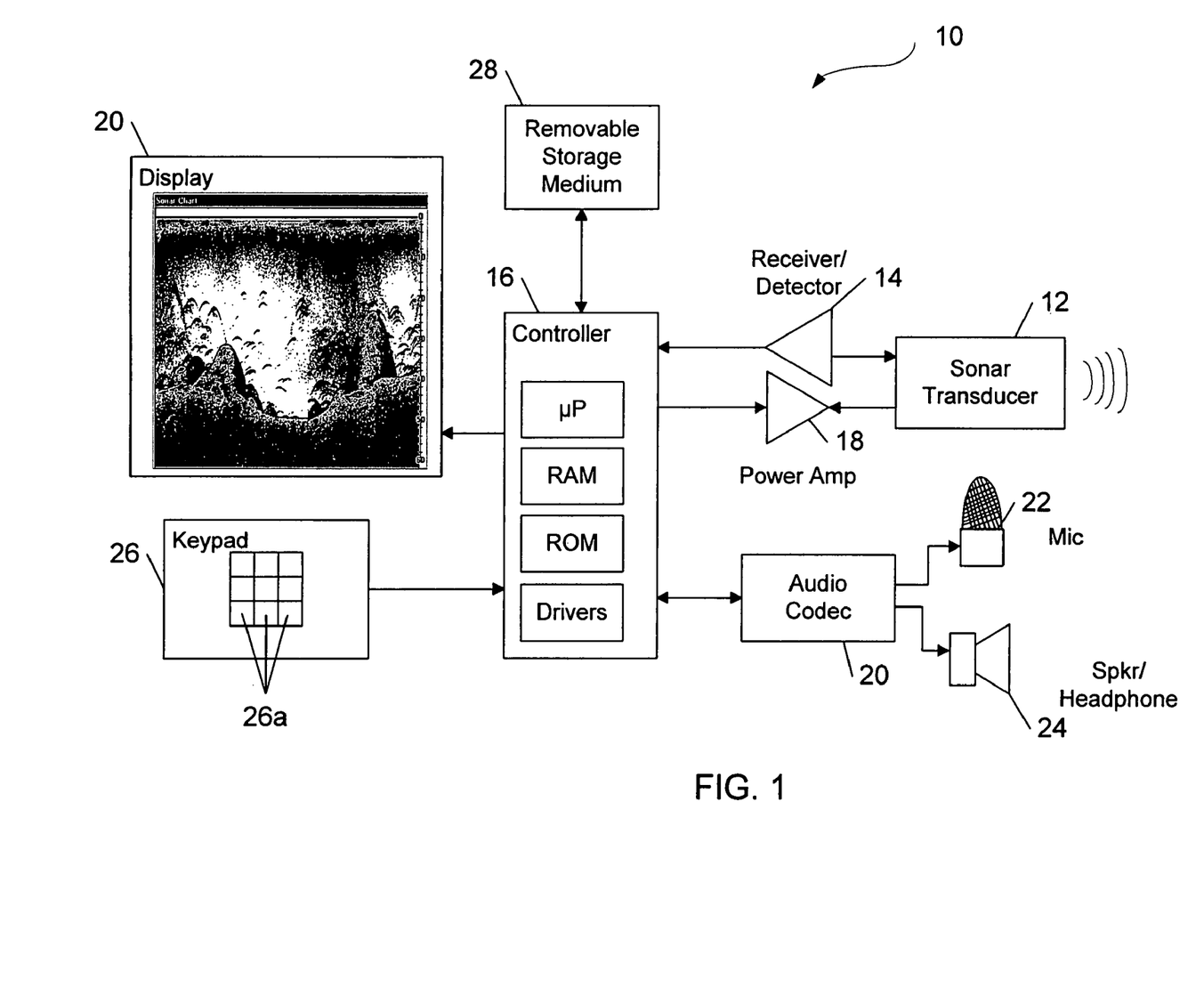
FIG. 1 is a block diagram of the components of an integrated sonar mapping system according to one embodiment of the present invention.

Referring now to FIG. 1, a block diagram of the integrated sonar mapping system 10 according to one embodiment of the present invention is shown. As illustrated in FIG. 1 and block 32 of FIG. 2, the integrated sonar and mapping system includes at least one transducer 12 for emitting sonar signals toward the bottom surface of a body of water. While the illustrated embodiment of the integrated sonar and mapping system includes only a single transducer, the integrated sonar and mapping system can include a plurality of transducers, each of which emits sonar signals, without departing from the spirit and scope of the present invention. In addition, the integrated sonar and mapping system can include a variety of types and configurations of transducers, including a plurality of transducers which are alternately driven or a phased array of transducers. As known to those skilled in the art, two or more transducers of a phased array of transducers are simultaneously driven in order to appropriately map the contour of the bottom surface of the body of water and to identify objects submerged therein, such as fish and underwater structures. Other alternative embodiments include transducers operating at different frequencies or producing different beam patterns.

Figure 2:
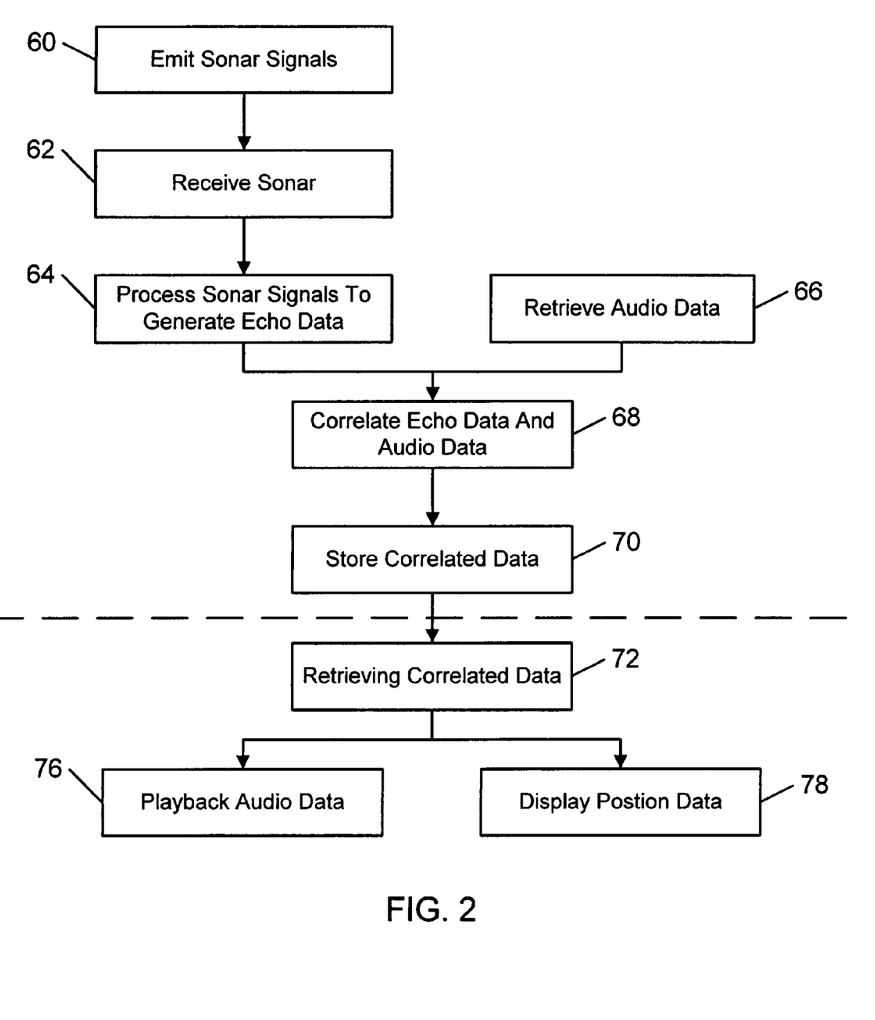
FIG. 2 is a flow diagram of a method of storing echo data and audio data according to one embodiment of the present invention.

As also known to those skilled in the art, sonar transducers 12 not only emit sonar signals into a body of water, but also initially receive the returning sonar signals which have been reflected by objects in the body of water as shown in block 34 of FIG. 2. The objects that reflect the sonar signals can include the bottom surface of the body of water, fish, and other submerged objects. Although the transducers initially receive the sonar signals, the integrated sonar and mapping system 10 can also include a receiver/detector 14 to process the returning sonar signals initially received by the transducers. For example, the receiver can filter and amplify the signals and can convert the signals from analog to digital.

In addition, embodiments of the integrated sonar mapping system 10 of the present invention which include the plurality of transducers 12 may also include a receiver/detector 14 for receiving and processing the returning sonar signals which are initially received by the transducers. The receiver 14 can include several additional electronic elements, such as a multiplexer electrically in communication with the plurality of transducers and the receiver. The multiplexer selects the returning sonar signals which were initially received by at least one of the transducers for receipt by the receiver. Accordingly, the integrated sonar mapping system can have a common or universal receiver for effectively receiving the returning sonar signals originally emitted by each of a plurality of transducers. Accordingly, it is expected that a receiver can include numerous processing, multiplexing, converting, buffering, and amplifying electronic elements in any combination, and the proper combinations for particular transducers are known to those of ordinary skill in the art. One example of such a combination is disclosed in U.S. Pat. No. 5,537,380 which is hereby incorporated by reference in its entirety with respect to all mapping system elements discussed herein.

As illustrated in FIG. 1, the integrated sonar mapping system 10 also includes a controller 16 (or a digital system). For example, the controller can include one or more microprocessors or microcontrollers which are electrically in communication with or networked for coordinated operation. Microcontrollers are known to those of ordinary skill in the art to include a microprocessor or CPU (central processing unit) and numerous peripheral processing and storage elements, such as display drivers, RAM, ROM, input/output buffers, keypad drivers, etc. Accordingly, these and other electronic elements may be included in any combination without departing from the spirit or scope of the invention.

The controller is also in communication with the receiver 14 for further processing the returning sonar signals. In particular, the controller generates echo data representative of the objects within the body of water that reflect the sonar signals. As shown in FIG. 1, the controller 16 typically controls the operation of the transducer 12 by driving the transducer via an associated power amplifier 18. Thus, the controller can provide an activation signal to the power amplifier associated with the selected transducer. The power amplifier 18, in turn, amplifies the signal provided by the controller and provides the amplified signal to the associated transducer, thereby driving the associated transducer to emit sonar signals into the body of water.

The integrated sonar mapping system 10 is also capable of recording and audibly reproducing audio by way of a microphone 22 and speaker 24. The microphone and speaker are operably connected to the controller by way of an audio coder-decoder 20 (codec), which converts analog audio input from the microphone to coded digital audio data that can be processed by the controller 16, and it also converts digital audio data to analog audio data so that the amplifier can make the signal large enough so that audio data is audibly reproduced by the speaker. The controller may advantageously store the audio data in a storage medium, such as an internal memory (RAM) or some flash memory.

As illustrated in FIG. 1, the audio data may also advantageously be stored in a removable storage medium 28 to permit the audio data to be removed and stored on other devices. For example, a removable flash memory, such as an MMC card, is compatible with many home computing systems and other consumer electronics devices. When the audio data is stored in a format commonly recognized by other electronics, the audio data may then be downloaded, stored, or played back on these other devices. In one advantageous embodiment, the digital audio data may be provided in MP3 format commonly used in consumer digital audio data devices. Another advantageous embodiment includes providing digital audio data in Ogg Vorbis format, an open source format licensed under the GNU General Public License. Other formats used to store and play digital are known to those of ordinary skill in the art and may be substituted without departing from the spirit or scope of the present invention.

In operation, the sonar process described above in conjunction with the various components of the integrated sonar and mapping system 10 is illustrated in FIG. 2. In particular, the controller 16 initially signals the power amplifier 18 to drive the associated transducer 12 to emit sonar signals into the body of water as shown in block 60. Thereafter, the returning sonar signals are received 62 and processed 64 for subsequent display as shown in block 78.

Referring concurrently to FIGS. 1 and 2, it is advantageous to retrieve audio data 66 from the microphone and correlate 68 digital audio data with the echo data retrieved from the transducer sonar signals. In practical use, digital audio data may be recorded to log and maintain historical data related to echo data, particularly when it is desired to supplement the sonar data with subjective data. For example, echo data may be saved in memory and may display the bottom, obstructions in the water, fish, temperature, etc., but would not include the presence of floating debris, nearby landmarks, the presence of other fisherman and other subjective data that would be of historical concern to the user of an integrated sonar system. Therefore, the audio data may be recorded, such as by a voice recording, to relate such information and correlate that information to the echo data. Therefore, audio data recoded by way of the microphone may be correlated 68 to sonar data and stored 70 in the removable storage medium for maintaining a historical record. Subsequently, after desired time delay represented by dashed line in FIG. 2, the data may be retrieved 72 for playback of audio data 76 and display of the correlated position data 78.

Additionally, the speaker 24 of the integrated sonar mapping system permits playback 76 of the audio data. The controller 16 accesses the removable storage medium 28 corresponding to correlated echo data and audio data. Accordingly, the controller 16 can play the audio data through the speaker 24 and concurrently display 78 the stored sonar data correlated to the audio data. The ability to playback audio data by way of the speaker or headphones advantageously permits other uncorrelated audio data to be reproduced. For example, the controller may convert any MP3 file or Ogg Vorbis file, or any other compatible digital audio file to be played through the speaker. As entertainment, music, audio books, etc. are easily stored in these and similar file formats, this advantageously permits the integrated sonar system to be used for entertainment purposes, without respect to the actually using the sonar or viewing echo data.

According to the present invention, the integrated sonar and mapping system 10 also includes a screen display 20, responsive to the controller 16, for providing a graphical representation of the echo data generated by the controller as shown in FIGS. 1 and 2. As described above, the echo data is representative of the objects within the body of water that reflect the sonar signals. Thus, the screen display 20 can provide a visual image of the contour of the bottom surface of the body of water as well as the relative locations of submerged objects, such as fish, for example. While a two-dimensional graphical representation of the echo data is illustrated herein, the integrated sonar mapping system and, more particularly, the screen display can provide the echo data in a variety of other formats, including a three-dimensional graphical representation, without departing from the spirit and scope of the present invention.

As also illustrated in FIG. 1, the integrated sonar mapping system 10 can also include keypad or a keys keypad 26. The keypad of one embodiment of the present invention includes a number of feature keys 26a typically positioned adjacent the screen display. Generally, these keys be specifically designated with a function such as a menu key, a zoom key, a power key, arrow keys, audio record key, audio playback key, etc. An appropriate legend or designation is typically provided on or adjacent to each respective key to indicate the function or feature provided by the associated key. Also, keys often have multiple functions related to menus displayed on the display. For example, the integrated sonar system has multiple functions, but for ease of use it is often desirable to minimize the number of keys present on the keypad. Accordingly, multifunction keys may correspond to an appropriate legend on the screen display and may include any of the functions of the above described keys.

Figure 3:
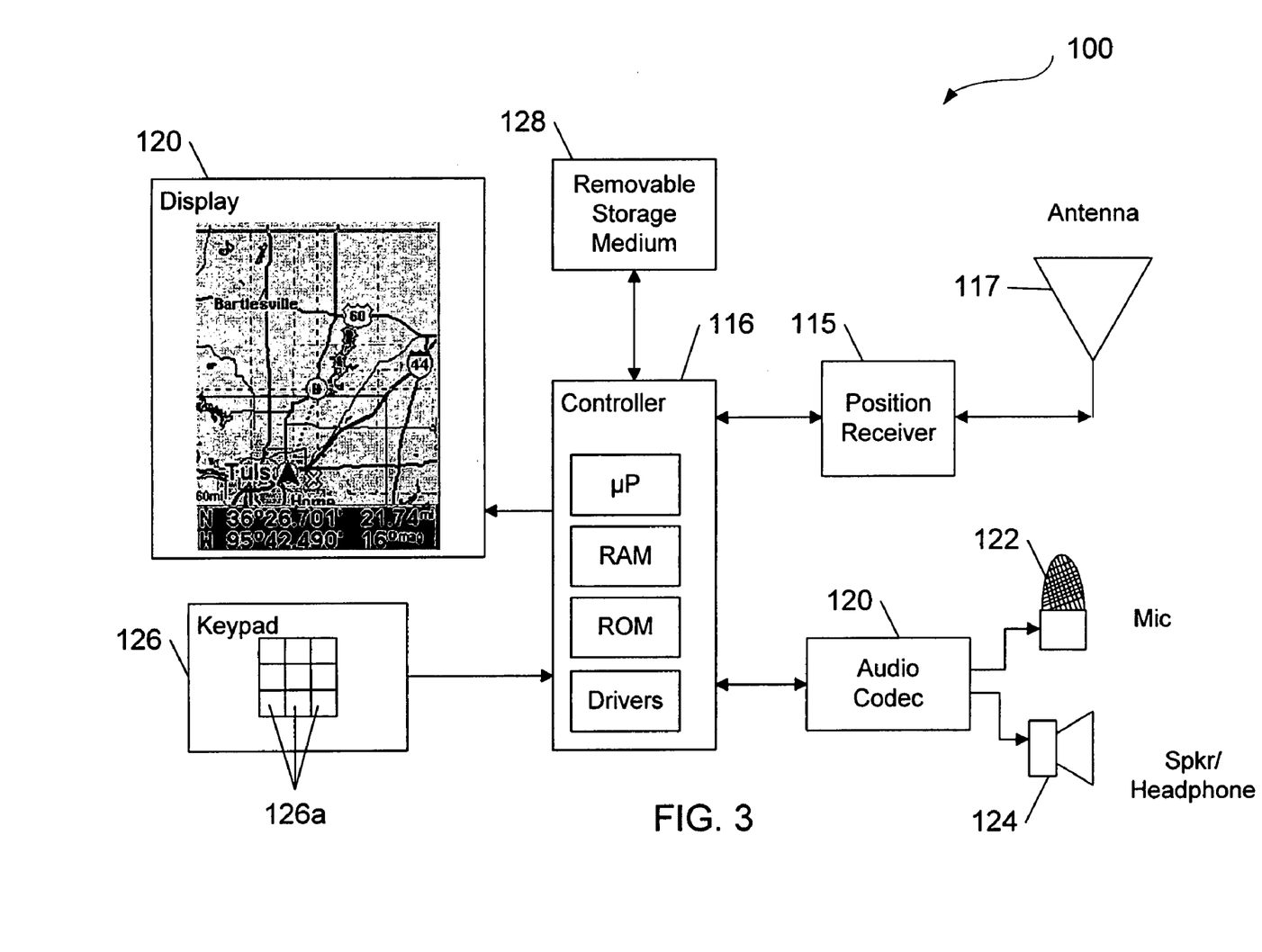
FIG. 3 is a block diagram of the components of an integrated position mapping system according to one embodiment of the present invention.

According to another embodiment of the invention illustrated in FIG. 3, an integrated position mapping system 100 provides navigational or positioning information, such as geographical coordinates of a present position and an audio recording, thereby creating an integrated position mapping system. In this embodiment, the integrated position mapping system includes an antenna 117 and positioning receiver 115, such as a GPS receiver, for receiving positioning signals from at least one reference transmitter. As known to those skilled in the art, the type of positioning receiver depends upon the type of reference base station emitting the positioning signals that are to be received. For example, the base stations related to this embodiment typically includes the GPS satellites, which provide extremely accurate satellite positioning signals from several satellites. The positioning receiver, therefore, generally includes a GPS-type receiver and antenna for receiving the positioning signals from the GPS satellites. In one embodiment, the reference transmitters are a plurality of land-based radio beacon transmitters. For example, the position receiver can include a Loran-C receiver, or other types of radio navigation positioning receivers. As such, it is possible to obtain position data with respect to only one base station, as is sometimes common in the Loran-C system. As such, only a line of position, rather than latitude or longitude, is provided by a single base station. For purposes of the present invention, a line of position is nonetheless considered position data.

Regardless of the origin of the positioning signals, the controller 116 of this embodiment is operably connected to the positioning receiver 115 for generating positioning data representative of a reference position based upon the positioning signals. Typically, the reference position is the position of the integrated position mapping system 100 antenna, since it is the location of the antenna transmission (for satellite navigation) or reception (for radio beacon navigation) that determines the corresponding position.

The integrated position mapping system 100 is also capable of recording and audibly reproducing audio by way of a microphone 122 and speaker 124. The microphone and speaker are operably connected to the controller by way of an audio codec and audio amplifier 120. The controller may advantageously store the audio data in a storage medium, such as an internal memory (RAM) or some flash memory. As illustrated in FIG. 3, the audio data may also advantageously be stored in a removable storage medium 128 to permit the audio data, such as an MMC card. Again, this card and formats such as MP3 and Ogg Vorbis make it advantageous to use the MMC card and audio files on compatible electronic devices, as in the integrated sonar system, described above.

Figure 4:
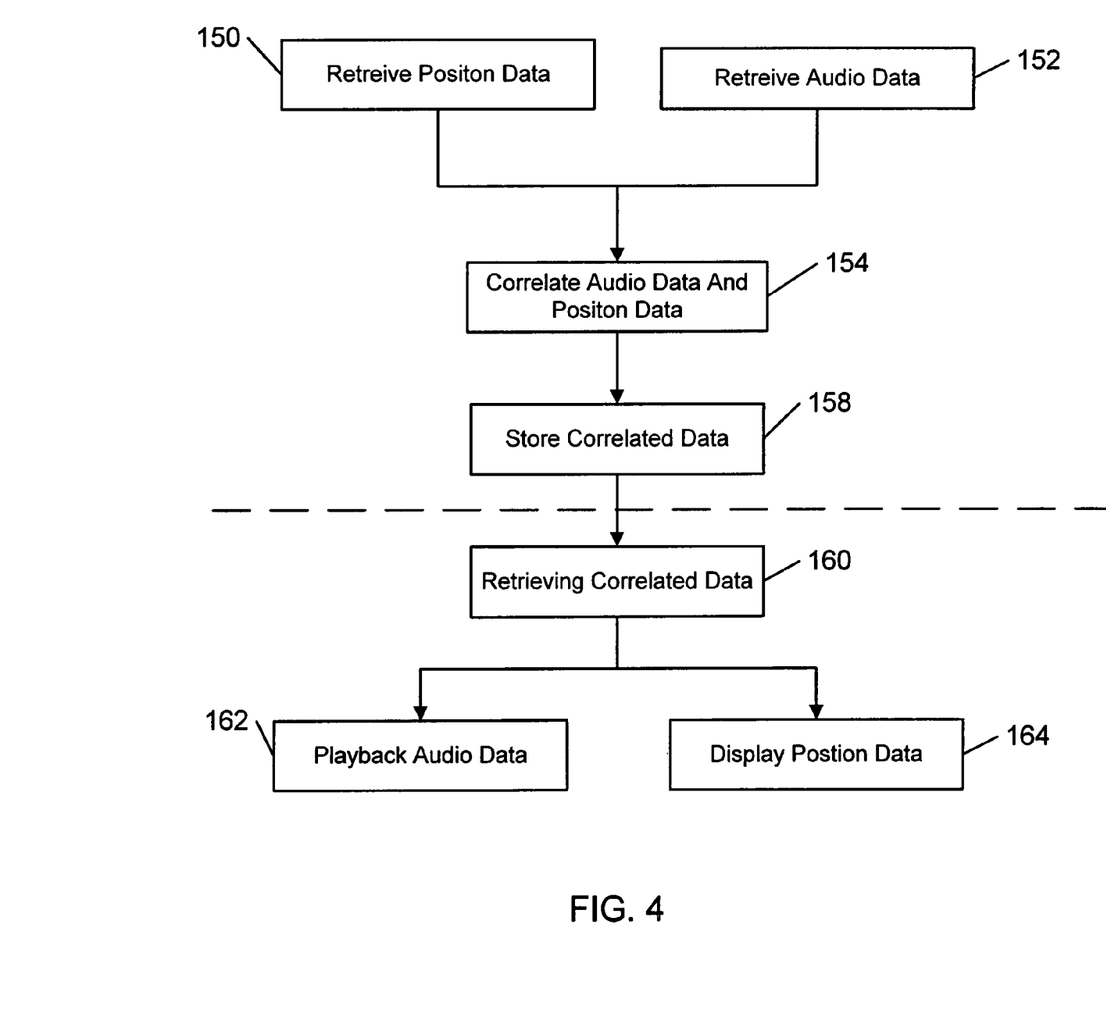
FIG. 4 is a flow diagram of a method of storing position data and audio data according to one embodiment of the present invention.

Referring concurrently to FIG. 4, it is advantageous to retrieve the audio data 152 and position data 150 and to correlate 154 digital audio data with position data. Like correlating echo data in the integrated sonar mapping system, digital audio data may be recorded to log and maintain historical data related to position data, particularly subjective data that is desired to be recorded regarding a certain position. Therefore, the audio data may be recorded, such as by a voice recording, to relate such information and correlate that information to the position data. Therefore, audio data recorded by way of the microphone may be correlated to position data 154 and stored 158 in the removable storage medium for maintaining a historical record.

Like the integrated sonar mapping system, the speaker or headphones 122 of the integrated position mapping system permits playback 162 of the audio data. The controller accesses the removable storage medium corresponding to correlated echo data and audio data. Accordingly, the controller can play the audio data through the speaker and concurrently display 164 the stored sonar data correlated to the audio data. The ability to playback audio data by way of the speaker advantageously permits other uncorrelated audio data to be reproduced. For example, the controller may convert any MP3 file or Ogg Vorbis file, or any other compatible digital audio file to be played through the speaker. As entertainment, music, audio books, etc. are easily stored in these and similar file formats, this advantageously permits the integrated sonar system to be used for entertainment purposes, without respect to the actually using the sonar or viewing echo data.

Referring once again to FIG. 3, the integrated position mapping system 100 may include cartographic storage for storing cartographic data representative of a map. The cartographic storage means can include a memory device disposed on the controller or digital system 116, such as read only memory (ROM), a flash or external memory device, in which the cartographic data is stored, such as in a cartographic data file. The memory device in which the cartographic data is stored can be either internal to the controller 116, as shown in FIG. 1, or external to the controller without departing from the spirit and scope of the present invention.

In addition, as will be apparent to those skilled in the art, the cartographic data can be stored in a variety of forms, including various vector, three dimensional, and charted representations of the cartographic data.

According to this embodiment, the screen display 120 of the integrated position mapping system 100 is capable of displaying a visual representation of the positioning data generated by the controller 116. For example, the screen display 120 of this embodiment is capable of displaying a graphical representation of the position data, such as coordinates in latitude and longitude or Universal Transverse Mercator (UTM). This representation may be not only numeric but cartographic such that a visual image of at least a portion of the map is thereby displayed. Further, the screen display 120 of this embodiment is capable of displaying a graphical representation of the cartographic data such that a visual image of at least a portion of the map is thereby displayed. The graphical representation of the positioning data can include textual or numerical information relating not only to the position of the system, but also to compass heading, bearing, course over ground and speed over ground. While this data may easily be obtained from time integration of a GPS signal, this data may also be provided by a compass, altimeter, speed measuring log, and other similar navigation devices known to those of ordinary skill in the art. In addition, if a route has been entered or one or more waypoints have been set by the operator, the integrated position mapping system can provide additional navigational data, such as a bearing, time and distance to the next waypoint.

In addition to the textual and numerical information, the screen display 120 can provide a graphical representation of the position of the integrated position mapping system 100. For example, a cursor or other reference icon can be displayed to indicate the relative position of the boat. In particular, the screen display 120 of this embodiment is preferably capable of concurrently displaying graphical representations of the cartographic data and the positioning data. For example, the cursor or other reference icon which identifies the position and can be displayed at the same time as the map, and properly positioned so as to indicate the position relative to the map. In one embodiment, the cartographic data is associated with geographical coordinates, such as the respective latitude and longitudinal position of the map, such that the cursor or other reference icon indicative of the position of the boat can be properly positioned relative to the geographical coordinates of the map that is concurrently displayed.

As illustrated in FIG. 3, the integrated position mapping system 100 may also include a keypad 126. As shown in FIG. 3, the keypad of one embodiment of the present invention includes a number of feature keys 126a and may include an appropriate legend or designation on or adjacent to each respective key to indicate the function or feature provided by the associated key.

Figure 5:
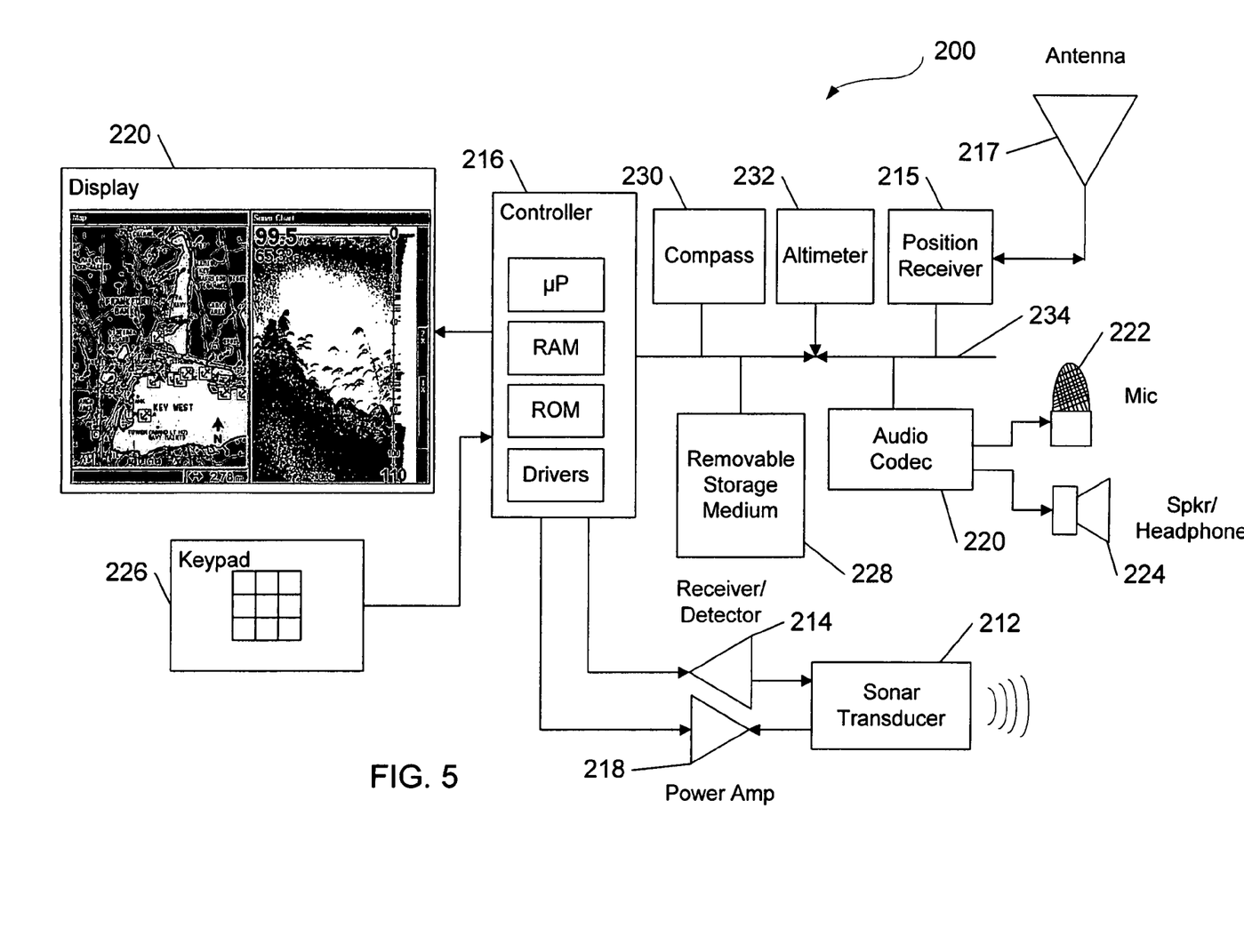
FIG. 5 is a block diagram of the components of an integrated sonar and position mapping system according to one embodiment of the present invention.

According to another embodiment illustrated in FIG. 5, the integrated sonar and position mapping system 200 can provide both sonar and position mapping features to the operator within a single unit. Thus, the operator need refer only to a single screen display 220 in order to obtain visual images of at least a portion of a map and of a sonar display. The iterated sonar and position mapping system includes many of the same elements as the above described position mapping system and sonar mapping system. The controller processes data and controls each of the elements in the same manner as described above. The sonar transducer 212, receiver/detector 214, and power amplifiers 218 include the same functionality as described in the integrated sonar system in conjunction with FIG. 1 and may be controlled by the controller in substantially the same manner. Also, the position receiver 215, removable storage medium 228, and audio codec 220 generally come in commercially available embodiments compatible with and communicating with microprocessors by way of a two way serial bus 234. Accordingly, it is advantageous to use devices that are so compatible in order to provide each of these elements on a common two way serial bus 234.

According to a further embodiment, the integrated sonar and position mapping system 200 provides not only sonar and mapping features, but also navigational features, including compass direction and altitude, which are provided by a compass 230 and altimeter 232, respectively. Similarly, the compass and altimeter may be provided in communication with the controller via a two way serial bus. The two way serial bus advantageously permits other additional features to be added in communication with the controller in order to provide additionally desired data, such as compass direction and altitude.

The screen display 220 is capable of concurrently displaying graphical representations of the cartographic data and the echo data. Thus, the operator can quickly analyze the output of each of the sonar mapping and position mapping features visual images of both the position data and echo data identifying the objects within the body of water reflecting the sonar signals. In addition, the incorporation of the sonar mapping, position mapping, and navigational features into a single system eliminates the need for additional systems and permits one integrated platform capable of providing the functionality of many other commonly used devices.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An integrated sonar mapping system, comprising:
   a sonar transducer for emitting a sonar signal through a body of water and for receiving return sonar signals reflected by objects in the body of water;
   a controller in communication with the sonar transducer for processing return signals to generate echo data representative of the returning sonar signals;
   a microphone in communication with the controller for providing audio data to the controller;
   a storage medium accessible by the controller for storing and retrieving the echo data and the audio data provided by the microphone, wherein the controller correlates the audio data from the microphone to echo data, and stores the correlated audio data and echo data in the storage medium; and
   an audio speaker responsive to the controller for audibly reproducing the audio data.

2. The integrated sonar mapping system according to claim 1, further comprising a keypad and a screen display, both the keypad and the screen display in communication with the controller for operably permitting visual display of echo data, and recording and playback of audio data.

3. The integrated sonar mapping system according to claim 1, wherein the storage medium comprises a removable storage medium.

4. The integrated sonar mapping system according to claim 3, wherein the removable storage medium comprises an MMC card.

5. The integrated sonar mapping system according to claim 1, further comprising an altimeter in communication with the controller for providing altitude data, wherein the controller correlates altitude data to the echo data and stores the correlated altitude data and echo data.

6. The integrated sonar mapping system according to claim 1, further comprising a compass in communication with the controller for providing directional data, wherein the controller correlates directional data to the echo data and stores the correlated directional data and echo data.

7. The integrated sonar mapping system according to claim 1, further comprising an audio codec for converting audio data from the microphone from analog format to a digital format, and converting digital data from the storage medium from a digital format to analog format.

8. The integrated sonar mapping system according to claim 1, further comprising a position receiver communicating with at least one base station positioning system, the position receiver for receiving position data corresponding to a position relative to the at least one base station positioning system, the position receiver in communication with the controller to provide position data to the controller.

9. A method of storing echo data and audio data, comprising:
  emitting a sonar signal through water;
  receiving a return sonar signal reflected by objects in the body of the water;
  processing echo data representative of the return sonar signal;
  receiving audio data from a microphone, the audio data corresponding to the echo data;
  correlating the echo data and the audio data; and
  storing the correlated echo data and audio data.

10. The method according to claim 9, further comprising converting the audio data into a digital format.

11. The method according to claim 10, wherein the step of converting the audio data comprises converting the audio data into a format selected from the group consisting of MP3, WAV, and Ogg Vorbis.

12. The method according to claim 10, wherein the step of converting the audio data comprises converting the audio data into an Ogg Vorbis format.

13. The method according to claim 9, further comprising retrieving the stored correlated audio data and echo data;
  displaying the sonar data on a display; and
  audibly reproducing the audio data.

14. An integrated position and sonar data mapping system, comprising:
  a position receiver communicating with at least one base station positioning system, the position receiver configured to receive position data corresponding to a position relative to the at least one base station positioning system;
  a sonar transducer for emitting a sonar signal through a body of water and for receiving return sonar signals reflected by objects in the body of water;
  a controller in communication with the position receiver and with the sonar transducer and configured to process the position data and the return signals to generate echo data representative of the returning sonar signals;
  a microphone in communication with the controller for providing audio data to the controller;
  a storage medium accessible by the controller for storing and retrieving the position data, the echo data, and the audio data provided by the microphone, wherein the controller correlates the audio data from the microphone to the position data and the echo data, and stores the correlated audio data, position data, and echo data in the storage medium; and
  an audio speaker responsive to the controller for audibly reproducing the audio data.

15. The integrated position mapping system according to claim 14, further comprising a keypad and a screen display, both the keypad and the screen display in communication with the controller for operably permitting visual display of position data, and recording and playback of audio data.

16. The integrated position mapping system according to claim 15, further comprising a cartographic data storage disposed in the controller and being selectable by the controller to display at least a portion of the cartographic data on the display.

17. The integrated position data mapping system according to claim 14, wherein the storage medium comprises a removable storage medium.

18. The integrated position data mapping system according to claim 17, wherein the removable storage medium comprises an MMC card.

19. The integrated position data mapping system according to claim 14, further comprising an altimeter in communication with the controller for providing altitude data, wherein the controller correlates altitude data to the position data and stores the correlated altitude data and position data.

20. The integrated position data mapping system according to claim 14, further comprising a compass in communication with the controller for providing directional data, wherein the controller correlates directional data to the position data and stores the correlated directional data and position data.

21. The integrated position data mapping system according to claim 14, further comprising an audio codec for converting audio data from the microphone from analog format to a digital format, and converting digital data from the storage medium from a digital format to analog format.

22. The integrated position data mapping system according to claim 14, wherein the position receiver comprises a position receiver selected from the group consisting of GPS receivers, satellite receivers, Loran receivers, and radio beacon receivers.

23. A method of storing position data, echo data, and audio data, comprising:
  receiving position data regarding a position from a position receiver;
  emitting a sonar signal through water;
  receiving a return sonar signal reflected by objects in the body of the water;
  processing echo data representative of the return sonar signal; receiving audio data from a microphone, the audio data corresponding to the positon data;
  correlating the position data, the echo data, and the audio data; and
  storing the correlated position data, echo data, and audio data.

24. The method according to claim 23, further comprising converting the audio data into a digital format.

25. The method according to claim 24, wherein the step of converting the audio data comprises converting the audio data into an MP3 format.

26. The method according to claim 24, wherein the step of converting the audio data comprises converting the audio data into an Ogg Vorbis format.

27. The method according to claim 23, further comprising retrieving the stored correlated audio data and position data;

displaying the position data on a display; and audibly reproducing the audio data.

\* \* \* \* \*

UNITED STATES PATENT AND TRADEMARK OFFICE
CERTIFICATE OF CORRECTION

PATENT NO. : 7,236,426 B2 Page 1 of 1
APPLICATION NO. : 10/937011
DATED : June 26, 2007
INVENTOR(S) : Turner et al.

It is certified that error appears in the above-identified patent and that said Letters Patent is hereby corrected as shown below:

<u>Column 12,</u> claim 23
Line 63, "positon" should read --position--.

Signed and Sealed this

Sixteenth Day of October, 2007

JON W. DUDAS
*Director of the United States Patent and Trademark Office*